(12) United States Patent
Cho et al.

(10) Patent No.: US 11,663,476 B2
(45) Date of Patent: May 30, 2023

(54) METHOD AND DEVICE FOR PROVIDING COMPRESSION AND TRANSMISSION OF TRAINING PARAMETERS IN DISTRIBUTED PROCESSING ENVIRONMENT

(71) Applicant: Electronics and Telecommunications Research Institute, Daejeon (KR)

(72) Inventors: Seung-Hyun Cho, Daejeon (KR); Youn-Hee Kim, Daejeon (KR); Jin-Wuk Seok, Daejeon (KR); Joo-Young Lee, Daejeon (KR); Woong Lim, Daejeon (KR); Jong-Ho Kim, Daejeon (KR); Dae-Yeol Lee, Daejeon (KR); Se-Yoon Jeong, Daejeon (KR); Hui-Yong Kim, Daejeon (KR); Jin-Soo Choi, Daejeon (KR); Je-Won Kang, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 393 days.

(21) Appl. No.: 16/772,557

(22) PCT Filed: Dec. 13, 2018

(86) PCT No.: PCT/KR2018/015845
§ 371 (c)(1),
(2) Date: Jun. 12, 2020

(87) PCT Pub. No.: WO2019/117646
PCT Pub. Date: Jun. 20, 2019

(65) Prior Publication Data
US 2020/0394514 A1  Dec. 17, 2020

(30) Foreign Application Priority Data

Dec. 15, 2017 (KR) .................. 10-2017-0172827
Dec. 13, 2018 (KR) .................. 10-2018-0160774

(51) Int. Cl.
*G06V 10/75* (2022.01)
*G06N 3/08* (2023.01)
(Continued)

(52) U.S. Cl.
CPC .......... *G06V 10/751* (2022.01); *G06F 18/214* (2023.01); *G06N 3/04* (2013.01); *G06N 3/08* (2013.01); *G06V 10/82* (2022.01)

(58) Field of Classification Search
None
See application file for complete search history.

(56) References Cited

U.S. PATENT DOCUMENTS

| 8,306,930 | B2 | 11/2012 | Ito et al. |
| 9,477,926 | B2 | 10/2016 | Yoon et al. |

(Continued)

FOREIGN PATENT DOCUMENTS

| JP | 2010020444 A | 1/2010 |
| JP | 2016501398 A | 1/2016 |

(Continued)

OTHER PUBLICATIONS

Song Han et al., Deep Compression: Compressing Deep Neural Networks With Pruning, Trained Quantization and Huffman Coding, ICLR, Feb. 15, 2016.

*Primary Examiner* — Leon Flores
(74) *Attorney, Agent, or Firm* — William Park & Associates Ltd.

(57) ABSTRACT

Disclosed herein are a method and apparatus for compressing learning parameters for training of a deep-learning model and transmitting the compressed parameters in a distributed processing environment. Multiple electronic devices in the distributed processing system perform training of a neural network. By performing training, parameters are updated. The electronic device may share the updated (Continued)

parameter thereof with additional electronic devices. In order to efficiently share the parameter, the residual of the parameter is provided to the additional electronic devices. When the residual of the parameter is provided, the additional electronic devices update the parameter using the residual of the parameter.

15 Claims, 12 Drawing Sheets

(51) Int. Cl.
 *G06N 3/04* (2023.01)
 *G06V 10/82* (2022.01)
 *G06F 18/214* (2023.01)

(56) References Cited

U.S. PATENT DOCUMENTS

| | | |
|---|---|---|
| 10,223,635 B2 | 3/2019 | Annapureddy et al. |
| 10,475,442 B2 | 11/2019 | Lee |
| 2009/0276472 A1 | 11/2009 | Subramanian et al. |
| 2015/0324686 A1 | 11/2015 | Julian et al. |
| 2015/0324690 A1 | 11/2015 | Chilimbi et al. |
| 2017/0069094 A1 | 3/2017 | Kim |
| 2017/0104993 A1 | 4/2017 | Jeong et al. |
| 2021/0287080 A1* | 9/2021 | Moloney ................ G06V 10/95 |

FOREIGN PATENT DOCUMENTS

| | | |
|---|---|---|
| KR | 1020170061016 A | 6/2017 |
| KR | 1020170106338 A | 9/2017 |

* cited by examiner

METHOD AND DEVICE FOR PROVIDING COMPRESSION AND TRANSMISSION OF TRAINING PARAMETERS IN DISTRIBUTED PROCESSING ENVIRONMENT

TECHNICAL FIELD

The following embodiments relate generally to a method and apparatus for deep learning in a distributed processing environment, and more particularly, to a method and apparatus for compressing learning parameters for training of a deep-learning model and transmitting the compressed parameters in a distributed processing environment.

BACKGROUND ART

A state-of-the-art deep-learning model, such as a convolutional neural network (CNN), is characterized by the large-scale network structure thereof, which is required in order to improve recognition performance.

Such a large-scale network structure increases the hierarchical depth of a model. With such an increase in the hierarchical depth, the number of weight parameters of edges, which connect the nodes of the network, also increases.

In order to develop such a large-scale deep-learning model, high-performance computer infrastructure based on distributed processing is essentially required. That is, with an increase in the amount of input data, a large number of computers is required in order to process the input data, and because a large number of computers is used, an efficient distributed-learning algorithm is important.

Methods for accelerating distributed learning may be largely classified into a data parallelism approach and a model parallelism approach.

The data parallelism approach is configured such that an input data set, which is the target of training, is partitioned and distributed across multiple computers and each of the multiple computers performs training using the partitioned input data set assigned thereto.

The model parallelism approach is configured such that a deep-learning model is partitioned and multiple computers perform training of the respective partitioned deep-learning model.

More specifically, in the data parallelism approach, the respective distributed computers in the distributed processing system perform training of the entire deep-learning model using the partitioned input data set.

Here, whenever training is iterated, a distributed computer exchanges a kernel parameter that is modified through training with another distributed computer. In other words, the modified kernel parameters are exchanged between the distributed computers in the distributed processing system.

Meanwhile, when the large-scale deep-learning model becomes too large to be loaded and processed by a single computer, a model parallelism approach may be used in order to partition the deep-learning model and to perform training of the partitioned deep-learning model. In the model parallelism approach, multiple distributed computers in the distributed processing system perform training of the respective segments of the deep-learning model.

Here, each of the distributed computers in the distributed processing system performs training using all of the input data and exchanges a local parameter, which is calculated only for the segment of the deep-learning model, with another distributed computer. That is, local parameters are exchanged between the distributed computers in the distributed processing system.

That is, in the process of training of a deep-learning model based on distributed processing, it is essential for the distributed computers of a distributed processing system to exchange kernel parameters with each other.

DISCLOSURE

Technical Problem

An embodiment may provide a method and apparatus for providing compression and transmission of learning parameters in a distributed processing environment.

An embodiment may provide a method and apparatus for sharing a parameter that is updated in one electronic device with multiple electronic devices in a distributed processing system.

Technical Solution

In one aspect, there is provided a method for providing information about an updated parameter, performed by an electronic device in a distributed processing system, the method including generating information for updating the parameter of a neural network; and transmitting the information for updating the parameter, wherein the information for updating the parameter is generated based on the state of the parameter updated by performing training and the state of the parameter before the training.

The information for updating the parameter may be generated based on the residual of the parameter.

The residual of the parameter may be a difference between the value of the parameter updated by performing the training and the value of the parameter before the training.

The information for updating the parameter may be transmitted to one or more other electronic devices that perform training of the neural network in the distributed processing system.

The information for updating the parameter may be transmitted to a parameter server in the distributed processing system.

The parameter server may transmit the information for updating the parameter to one or more electronic devices that perform training of the neural network in the distributed processing system.

The electronic device may perform training of one of the multiple layers of a deep-learning model.

In another aspect, there is provided a method for updating a parameter, performed by an electronic device in a distributed processing system, the method including receiving information for updating the parameter from an additional device in the distributed processing system; and updating the parameter using the information for updating the parameter, wherein the residual of the parameter is generated based on the information for updating the parameter, and the parameter is updated by adding the residual of the parameter to the parameter.

The parameter may comprise multiple parameters.

The multiple parameters may configure one layer of a deep-learning model.

The information for updating the parameter may include compressed residuals of the multiple parameters.

The residuals of the multiple parameters may be acquired by performing decoding for the compressed residuals of the multiple parameters included in the information for updating the parameter.

The multiple parameters may be updated using the residuals of the multiple parameters.

When the decoding is performed, a method for decoding a block of an image may be used.

Each of the multiple parameters may correspond to the block.

The block may comprise multiple blocks.

The multiple blocks may configure a target image.

When the decoding is performed, a method for decoding the target image may be used.

In order to perform the decoding, one or more of entropy decoding, scanning, dequantization, and inverse-transform of the block may be used.

Based on the information for updating the parameter, scanned information may be generated.

The scanned information may include scanned quantized gradients.

Quantized gradients may be generated by performing 1D-to-2D scanning for the scanned information.

Reconstructed gradients may be generated by performing dequantization for the quantized gradients.

The reconstructed gradients may be the residuals of the multiple parameters.

The scanned information may include a zero subblock.

The zero subblock may indicate a specified region in a block and indicate that the values of all of quantized gradients in the specified region are 0.

The scanned information may include a zero block.

The zero block may indicate that the values of all of quantized gradients in the block are 0.

The scanned information may include a zero layer.

The zero layer may indicate that the values of all of quantized gradients in all of the blocks of the layer are 0.

In a further aspect, there is provided an electronic device in a distributed processing system, the electronic device including a communication unit for receiving information for updating a parameter from another device in the distributed processing system; and a processing unit for updating the parameter using the information for updating the parameter, wherein the processing unit generates a residual of the parameter based on the information for updating the parameter and updates the parameter by adding the residual of the parameter to the parameter.

Advantageous Effects

There are provided a method and apparatus for providing compression and transmission of learning parameters in a distributed processing environment.

There are provided a method and apparatus for sharing a parameter that is updated in one electronic device with multiple electronic devices in a distributed processing system.

BEST MODE

Figure 1:
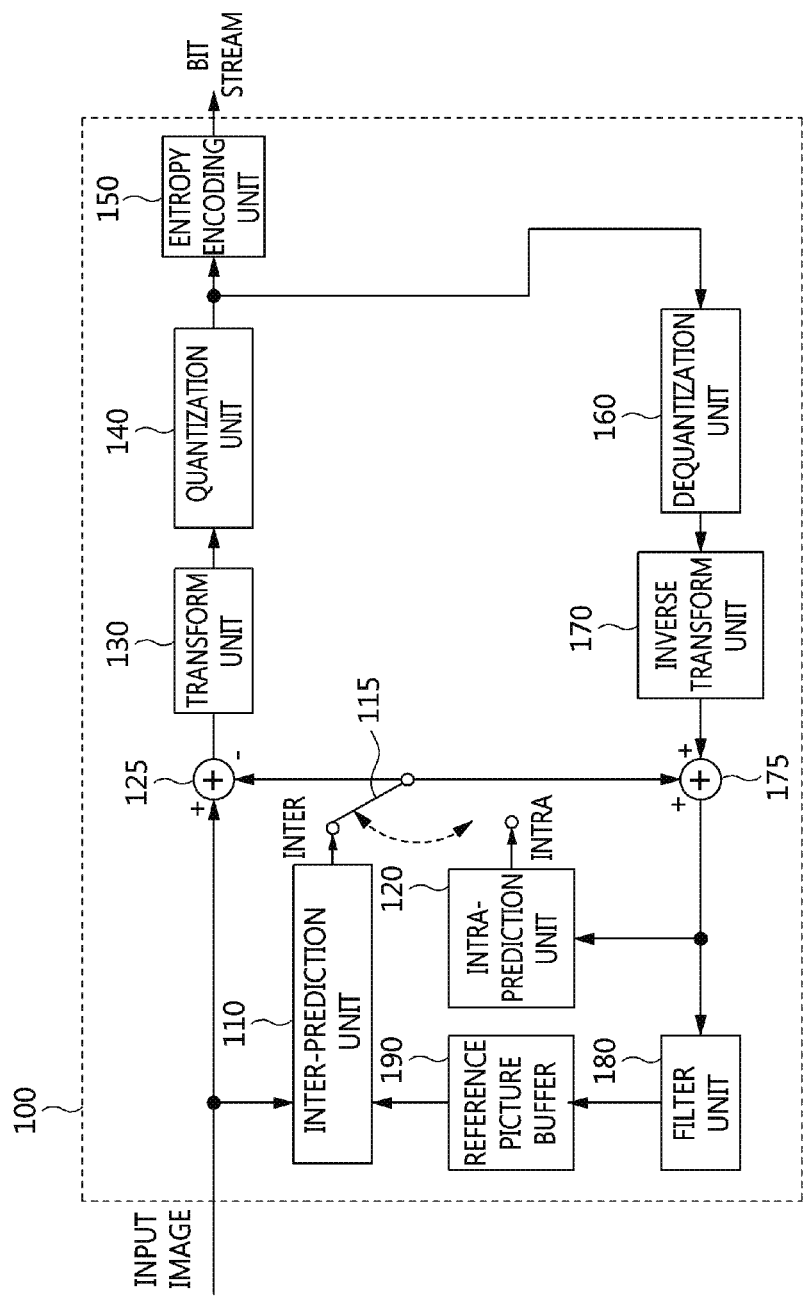
FIG. 1 is a block diagram illustrating the configuration of an embodiment of an encoding apparatus to which the present disclosure is applied.

The present invention may be variously changed, and may have various embodiments, and specific embodiments will be described in detail below with reference to the attached drawings. However, it should be understood that those embodiments are not intended to limit the present invention to specific disclosure forms, and that they include all changes, equivalents or modifications included in the spirit and scope of the present invention.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but do not need to be mutually exclusive of each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

Terms such as "first" and "second" may be used to describe various components, but the components are not restricted by the terms. The terms are used only to distinguish one component from another component. For example, a first component may be named a second component without departing from the scope of the present specification. Likewise, a second component may be named a first component. The terms "and/or" may include combinations of a plurality of related described items or any of a plurality of related described items.

It will be understood that when a component is referred to as being "connected" or "coupled" to another component, the two components may be directly connected or coupled to each other, or intervening components may be present between the two components. It will be understood that when a component is referred to as being "directly connected or coupled", no intervening components are present between the two components.

Also, components described in the embodiments are independently shown in order to indicate different characteristic functions, but this does not mean that each of the components is formed of a separate piece of hardware or software. That is, the components are arranged and included separately for convenience of description. For example, at least two of the components may be integrated into a single component. Conversely, one component may be divided into multiple components. An embodiment into which the components are integrated or an embodiment in which some components are separated is included in the scope of the present specification as long as it does not depart from the essence of the present specification.

Further, it should be noted that, in the exemplary embodiments, an expression describing that a component "comprises" a specific component means that additional components may be included within the scope of the practice or the technical spirit of exemplary embodiments, but does not preclude the presence of components other than the specific component.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted. Further, the same reference numerals are used to designate the same components throughout the drawings, and repeated descriptions of the same components will be omitted.

Hereinafter, "image" may mean a single picture constituting a video, or may mean the video itself. For example, "encoding and/or decoding of an image" may mean "encoding and/or decoding of a video", and may also mean "encoding and/or decoding of any one of images constituting the video".

Hereinafter, the terms "video" and "motion picture" may be used to have the same meaning, and may be used interchangeably with each other.

Hereinafter, a target image may be an encoding target image, which is the target to be encoded, and/or a decoding target image, which is the target to be decoded. Further, the target image may be an input image that is input to an encoding apparatus or an input image that is input to a decoding apparatus.

Hereinafter, the terms "image", "picture", "frame", and "screen" may be used to have the same meaning and may be used interchangeably with each other.

Hereinafter, a target block may be an encoding target block, i.e. the target to be encoded and/or a decoding target block, i.e. the target to be decoded. Further, the target block may be a current block, i.e. the target to be currently encoded and/or decoded. Here, the terms "target block" and "current block" may be used to have the same meaning, and may be used interchangeably with each other.

Hereinafter, the terms "block" and "unit" may be used to have the same meaning, and may be used interchangeably with each other. Alternatively, "block" may denote a specific unit.

Hereinafter, the terms "region" and "segment" may be used interchangeably with each other.

Hereinafter, a specific signal may be a signal indicating a specific block. For example, the original signal may be a signal indicating a target block. A prediction signal may be a signal indicating a prediction block. A residual signal may be a signal indicating a residual block.

In the following embodiments, specific information, data, a flag, an element, and an attribute may have their respective values. A value of "0" corresponding to each of the information, data, flag, element, and attribute may indicate a logical false or a first predefined value. In other words, the value of "0", false, logical false, and a first predefined value may be used interchangeably with each other. A value of "1" corresponding to each of the information, data, flag, element, and attribute may indicate a logical true or a second predefined value. In other words, the value of "1", true, logical true, and a second predefined value may be used interchangeably with each other.

When a variable such as i or j is used to indicate a row, a column, or an index, the value of i may be an integer of 0 or more or an integer of 1 or more. In other words, in the embodiments, each of a row, a column, and an index may be counted from 0 or may be counted from 1.

Below, the terms to be used in embodiments will be described.

Encoder: An encoder denotes a device for performing encoding.

Decoder: A decoder denotes a device for performing decoding.

Unit: A unit may denote the unit of image encoding and decoding. The terms "unit" and "block" may be used to have the same meaning, and may be used interchangeably with each other.

"Unit" may be an M×N array of samples. M and N may be positive integers, respectively. The term "unit" may generally mean a two-dimensional (2D) array of samples.

In the encoding and decoding of an image, "unit" may be an area generated by the partitioning of one image. In other words, "unit" may be a region specified in one image. A single image may be partitioned into multiple units. Alternatively, one image may be partitioned into sub-parts, and the unit may denote each partitioned sub-part when encoding or decoding is performed on the partitioned sub-part.

In the encoding and decoding of an image, predefined processing may be performed on each unit depending on the type of the unit.

Depending on functions, the unit types may be classified into a macro unit, a Coding Unit (CU), a Prediction Unit (PU), a residual unit, a Transform Unit (TU), etc. Alternatively, depending on functions, the unit may denote a block, a macroblock, a coding tree unit, a coding tree block, a coding unit, a coding block, a prediction unit, a prediction block, a residual unit, a residual block, a transform unit, a transform block, etc.

The term "unit" may mean information including a luminance (luma) component block, a chrominance (chroma) component block corresponding thereto, and syntax elements for respective blocks so that the unit is designated to be distinguished from a block.

The size and shape of a unit may be variously implemented. Further, a unit may have any of various sizes and shapes. In particular, the shapes of the unit may include not only a square, but also a geometric figure that can be represented in two dimensions (2D), such as a rectangle, a trapezoid, a triangle, and a pentagon.

Further, unit information may include one or more of the type of a unit, the size of a unit, the depth of a unit, the order of encoding of a unit and the order of decoding of a unit, etc. For example, the type of a unit may indicate one of a CU, a PU, a residual unit and a TU.

One unit may be partitioned into sub-units, each having a smaller size than that of the relevant unit.

Depth: A depth may denote the degree to which the unit is partitioned. Further, the unit depth may indicate the level at which the corresponding unit is present when units are represented in a tree structure.

Unit partition information may include a depth indicating the depth of a unit. A depth may indicate the number of times the unit is partitioned and/or the degree to which the unit is partitioned.

In a tree structure, it may be considered that the depth of a root node is the smallest, and the depth of a leaf node is the largest.

A single unit may be hierarchically partitioned into multiple sub-units while having depth information based on a tree structure. In other words, the unit and sub-units, generated by partitioning the unit, may correspond to a node and child nodes of the node, respectively. Each of the partitioned sub-units may have a unit depth. Since the depth indicates the number of times the unit is partitioned and/or the degree to which the unit is partitioned, the partition information of the sub-units may include information about the sizes of the sub-units.

In a tree structure, the top node may correspond to the initial node before partitioning. The top node may be referred to as a "root node". Further, the root node may have a minimum depth value. Here, the top node may have a depth of level '0'.

A node having a depth of level '1' may denote a unit generated when the initial unit is partitioned once. A node having a depth of level '2' may denote a unit generated when the initial unit is partitioned twice.

A leaf node having a depth of level 'n' may denote a unit generated when the initial unit has been partitioned n times.

The leaf node may be a bottom node, which cannot be partitioned any further. The depth of the leaf node may be the maximum level. For example, a predefined value for the maximum level may be 3.

A QT depth may denote a depth for a quad-partitioning. A BT depth may denote a depth for a binary-partitioning. A TT depth may denote a depth for a ternary-partitioning.

Sample: A sample may be a base unit constituting a block. A sample may be represented by values from 0 to $2^{Bd}-1$ depending on the bit depth (Bd).

A sample may be a pixel or a pixel value.

Hereinafter, the terms "pixel" and "sample" may be used to have the same meaning, and may be used interchangeably with each other.

A Coding Tree Unit (CTU): A CTU may be composed of a single luma component (Y) coding tree block and two chroma component (Cb, Cr) coding tree blocks related to the luma component coding tree block. Further, a CTU may mean information including the above blocks and a syntax element for each of the blocks.

Each coding tree unit (CTU) may be partitioned using one or more partitioning methods, such as a quad tree (QT), a binary tree (BT), and a ternary tree (TT) so as to configure sub-units, such as a coding unit, a prediction unit, and a transform unit. Further, each coding tree unit may be partitioned using a multitype tree (MTT) using one or more partitioning methods.

"CTU" may be used as a term designating a pixel block, which is a processing unit in an image-decoding and encoding process, as in the case of partitioning of an input image.

Coding Tree Block (CTB): "CTB" may be used as a term designating any one of a Y coding tree block, a Cb coding tree block, and a Cr coding tree block.

Neighbor block: A neighbor block (or neighboring block) may mean a block adjacent to a target block. A neighbor block may mean a reconstructed neighbor block.

Hereinafter, the terms "neighbor block" and "adjacent block" may be used to have the same meaning and may be used interchangeably with each other.

Spatial neighbor block; A spatial neighbor block may a block spatially adjacent to a target block. A neighbor block may include a spatial neighbor block.

The target block and the spatial neighbor block may be included in a target picture.

The spatial neighbor block may mean a block, the boundary of which is in contact with the target block, or a block located within a predetermined distance from the target block.

The spatial neighbor block may mean a block adjacent to the vertex of the target block. Here, the block adjacent to the vertex of the target block may mean a block vertically adjacent to a neighbor block which is horizontally adjacent to the target block or a block horizontally adjacent to a neighbor block which is vertically adjacent to the target block.

Temporal neighbor block: A temporal neighbor block may be a block temporally adjacent to a target block. A neighbor block may include a temporal neighbor block.

The temporal neighbor block may include a co-located block (col block).

The col block may be a block in a previously reconstructed co-located picture (col picture). The location of the col block in the col-picture may correspond to the location of the target block in a target picture. Alternatively, the location of the col block in the col-picture may be equal to the location of the target block in the target picture. The col picture may be a picture included in a reference picture list.

The temporal neighbor block may be a block temporally adjacent to a spatial neighbor block of a target block.

Prediction unit: A prediction unit may be a base unit for prediction, such as inter prediction, intra prediction, inter compensation, intra compensation, and motion compensation.

A single prediction unit may be divided into multiple partitions having smaller sizes or sub-prediction units. The multiple partitions may also be base units in the performance of prediction or compensation. The partitions generated by dividing the prediction unit may also be prediction units.

Prediction unit partition: A prediction unit partition may be the shape into which a prediction unit is divided.

Reconstructed neighboring unit: A reconstructed neighboring unit may be a unit which has already been decoded and reconstructed around a target unit.

A reconstructed neighboring unit may be a unit that is spatially adjacent to the target unit or that is temporally adjacent to the target unit.

A reconstructed spatially neighboring unit may be a unit which is included in a target picture and which has already been reconstructed through encoding and/or decoding.

A reconstructed temporally neighboring unit may be a unit which is included in a reference image and which has already been reconstructed through encoding and/or decoding. The location of the reconstructed temporally neighboring unit in the reference image may be identical to that of the target unit in the target picture, or may correspond to the location of the target unit in the target picture.

Parameter set: A parameter set may be header information in the structure of a bitstream. For example, a parameter set may include a video parameter set (VPS), a sequence parameter set (SPS), a picture parameter set (PPS), an adaptation parameter set APS), etc.

Further, the parameter set may include slice header information and tile header information.

Rate-distortion optimization: An encoding apparatus may use rate-distortion optimization so as to provide high coding efficiency by utilizing combinations of the size of a coding unit (CU), a prediction mode, the size of a prediction unit (PU), motion information, and the size of a transform unit (TU).

A rate-distortion optimization scheme may calculate rate-distortion costs of respective combinations so as to select an optimal combination from among the combinations. The rate-distortion costs may be calculated using the following Equation 1. Generally, a combination enabling the rate-distortion cost to be minimized may be selected as the optimal combination in the rate-distortion optimization scheme.

$$D+\lambda *R \quad \text{[Equation 1]}$$

D may denote distortion. D may be the mean of squares of differences (i.e. mean square error) between original transform coefficients and reconstructed transform coefficients in a transform unit.

R may denote the rate, which may denote a bit rate using related-context information.

$\lambda$ denotes a Lagrangian multiplier. R may include not only coding parameter information, such as a prediction mode, motion information, and a coded block flag, but also bits generated due to the encoding of transform coefficients.

An encoding apparatus may perform procedures, such as inter prediction and/or intra prediction, transform, quantization, entropy encoding, inverse quantization (dequantization), and inverse transform so as to calculate precise D and R. These procedures may greatly increase the complexity of the encoding apparatus.

Bitstream: A bitstream may denote a stream of bits including encoded image information.

Parameter set: A parameter set may be header information in the structure of a bitstream.

The parameter set may include at least one of a video parameter set, a sequence parameter set, a picture parameter set, and an adaptation parameter set. Further, the parameter set may include information about a slice header and information about a tile header.

Parsing: Parsing may be the decision on the value of a syntax element, made by performing entropy decoding on a bitstream. Alternatively, the term "parsing" may mean such entropy decoding itself.

Symbol: A symbol may be at least one of the syntax element, the coding parameter, and the transform coefficient of an encoding target unit and/or a decoding target unit. Further, a symbol may be the target of entropy encoding or the result of entropy decoding.

Reference picture: A reference picture may be an image referred to by a unit so as to perform inter prediction or motion compensation. Alternatively, a reference picture may be an image including a reference unit referred to by a target unit so as to perform inter prediction or motion compensation.

Hereinafter, the terms "reference picture" and "reference image" may be used to have the same meaning, and may be used interchangeably with each other.

Reference picture list: A reference picture list may be a list including one or more reference images used for inter prediction or motion compensation.

The types of a reference picture list may include List Combined (LC), List 0 (L0), List 1 (L1), List 2 (L2), List 3 (L3), etc.

For inter prediction, one or more reference picture lists may be used.

Inter-prediction indicator: An inter-prediction indicator may indicate the inter-prediction direction for a target unit. Inter prediction may be one of unidirectional prediction and bidirectional prediction. Alternatively, the inter-prediction indicator may denote the number of reference images used to generate a prediction unit of a target unit. Alternatively, the inter-prediction indicator may denote the number of prediction blocks used for inter prediction or motion compensation of a target unit.

Reference picture index: A reference picture index may be an index indicating a specific reference image in a reference picture list.

Motion vector (MV): A motion vector may be a 2D vector used for inter prediction or motion compensation. A motion vector may mean an offset between a target image and a reference image.

For example, a MV may be represented in a form such as ($mv_x$, $mv_y$). $mv_x$ may indicate a horizontal component, and $mv_y$ may indicate a vertical component.

Search range: A search range may be a 2D area in which a search for a MV is performed during inter prediction. For example, the size of the search range may be M×N. M and N may be respective positive integers.

Motion vector candidate: A motion vector candidate may be a block that is a prediction candidate or the motion vector of the block that is a prediction candidate when a motion vector is predicted.

A motion vector candidate may be included in a motion vector candidate list.

Motion vector candidate list: A motion vector candidate list may be a list configured using one or more motion vector candidates.

Motion vector candidate index: A motion vector candidate index may be an indicator for indicating a motion vector candidate in the motion vector candidate list. Alternatively, a motion vector candidate index may be the index of a motion vector predictor.

Motion information: Motion information may be information including at least one of a reference picture list, a reference image, a motion vector candidate, a motion vector candidate index, a merge candidate, and a merge index, as well as a motion vector, a reference picture index, and an inter-prediction indicator.

Merge candidate list: A merge candidate list may be a list configured using merge candidates.

Merge candidate: A merge candidate may be a spatial merge candidate, a temporal merge candidate, a combined merge candidate, a combined bi-prediction merge candidate, a zero-merge candidate, etc. A merge candidate may include motion information such as prediction type information, a reference picture index for each list, and a motion vector.

Merge index: A merge index may be an indicator for indicating a merge candidate in a merge candidate list.

A merge index may indicate a reconstructed unit used to derive a merge candidate between a reconstructed unit spatially adjacent to a target unit and a reconstructed unit temporally adjacent to the target unit.

A merge index may indicate at least one of pieces of motion information of a merge candidate.

Transform unit: A transform unit may be the base unit of residual signal encoding and/or residual signal decoding, such as transform, inverse transform, quantization, dequantization, transform coefficient encoding, and transform coefficient decoding. A single transform unit may be partitioned into multiple transform units having smaller sizes.

Scaling: Scaling may denote a procedure for multiplying a factor by a transform coefficient level.

As a result of scaling of the transform coefficient level, a transform coefficient may be generated. Scaling may also be referred to as "dequantization".

Quantization Parameter (QP): A quantization parameter may be a value used to generate a transform coefficient level for a transform coefficient in quantization. Alternatively, a quantization parameter may also be a value used to generate a transform coefficient by scaling the transform coefficient level in dequantization. Alternatively, a quantization parameter may be a value mapped to a quantization step size.

Delta quantization parameter: A delta quantization parameter is a differential value between a predicted quantization parameter and the quantization parameter of a target unit.

Scan: Scan may denote a method for aligning the order of coefficients in a unit, a block or a matrix. For example, a method for aligning a 2D array in the form of a one-dimensional (1D) array may be referred to as a "scan". Alternatively, a method for aligning a 1D array in the form of a 2D array may also be referred to as a "scan" or an "inverse scan".

Transform coefficient: A transform coefficient may be a coefficient value generated as an encoding apparatus performs a transform. Alternatively, the transform coefficient may be a coefficient value generated as a decoding apparatus performs at least one of entropy decoding and dequantization.

A quantized level or a quantized transform coefficient level generated by applying quantization to a transform coefficient or a residual signal may also be included in the meaning of the term "transform coefficient".

Quantized level: A quantized level may be a value generated as the encoding apparatus performs quantization on a transform coefficient or a residual signal. Alternatively, the quantized level may be a value that is the target of dequantization as the decoding apparatus performs dequantization.

A quantized transform coefficient level, which is the result of transform and quantization, may also be included in the meaning of a quantized level.

Non-zero transform coefficient: A non-zero transform coefficient may be a transform coefficient having a value other than 0 or a transform coefficient level having a value other than 0. Alternatively, a non-zero transform coefficient may be a transform coefficient, the magnitude of the value of which is not 0, or a transform coefficient level, the magnitude of the value of which is not 0.

Quantization matrix: A quantization matrix may be a matrix used in a quantization procedure or a dequantization procedure so as to improve the subjective image quality or objective image quality of an image. A quantization matrix may also be referred to as a "scaling list".

Quantization matrix coefficient: A quantization matrix coefficient may be each element in a quantization matrix. A quantization matrix coefficient may also be referred to as a "matrix coefficient".

Default matrix: A default matrix may be a quantization matrix predefined by the encoding apparatus and the decoding apparatus.

Non-default matrix: A non-default matrix may be a quantization matrix that is not predefined by the encoding apparatus and the decoding apparatus. The non-default matrix may be signaled by the encoding apparatus to the decoding apparatus.

Most Probable Mode (MPM): An MPM may denote an intra-prediction mode having a high probability of being used for intra prediction for a target block.

An encoding apparatus and a decoding apparatus may determine one or more MPMs based on coding parameters related to the target block and the attributes of entities related to the target block.

The encoding apparatus and the decoding apparatus may determine one or more MPMs based on the intra-prediction mode of a reference block. The reference block may include multiple reference blocks. The multiple reference blocks may include spatial neighbor blocks adjacent to the left of the target block and spatial neighbor blocks adjacent to the top of the target block. In other words, depending on which intra-prediction modes have been used for the reference blocks, one or more different MPMs may be determined.

The one or more MPMs may be determined in the same manner both in the encoding apparatus and in the decoding apparatus. That is, the encoding apparatus and the decoding apparatus may share the same MPM list including one or more MPMs.

MPM list: An MPM list may be a list including one or more MPMs. The number of the one or more MPMs in the MPM list may be defined in advance.

MPM indicator: An MPM indicator may indicate an MPM to be used for intra prediction for a target block among one or more MPMs in the MPM list. For example, the MPM indicator may be an index for the MPM list.

Since the MPM list is determined in the same manner both in the encoding apparatus and in the decoding apparatus, there may be no need to transmit the MPM list itself from the encoding apparatus to the decoding apparatus.

The MPM indicator may be signaled from the encoding apparatus to the decoding apparatus. As the MPM indicator is signaled, the decoding apparatus may determine the MPM to be used for intra prediction for the target block among the MPMs in the MPM list.

MPM use indicator: An MPM use indicator may indicate whether an MPM usage mode is to be used for prediction for a target block. The MPM usage mode may be a mode in which the MPM to be used for intra prediction for the target block is determined using the MPM list.

The MPM usage indicator may be signaled from the encoding apparatus to the decoding apparatus.

Signaling: "signaling" may denote that information is transferred from an encoding apparatus to a decoding apparatus. Alternatively, "signaling" may mean information is included in in a bitstream or a recoding medium. Information signaled by an encoding apparatus may be used by a decoding apparatus.

FIG. 1 is a block diagram illustrating the configuration of an embodiment of an encoding apparatus to which the present disclosure is applied.

An encoding apparatus 100 may be an encoder, a video encoding apparatus or an image encoding apparatus. A video may include one or more images (pictures). The encoding apparatus 100 may sequentially encode one or more images of the video.

Referring to FIG. 1, the encoding apparatus 100 includes an inter-prediction unit 110, an intra-prediction unit 120, a switch 115, a subtractor 125, a transform unit 130, a quantization unit 140, an entropy encoding unit 150, a dequantization (inverse quantization) unit 160, an inverse transform unit 170, an adder 175, a filter unit 180, and a reference picture buffer 190.

The encoding apparatus 100 may perform encoding on a target image using an intra mode and/or an inter mode.

Further, the encoding apparatus 100 may generate a bitstream, including information about encoding, via encoding on the target image, and may output the generated bitstream. The generated bitstream may be stored in a computer-readable storage medium and may be streamed through a wired/wireless transmission medium.

When the intra mode is used as a prediction mode, the switch 115 may switch to the intra mode. When the inter mode is used as a prediction mode, the switch 115 may switch to the inter mode.

The encoding apparatus 100 may generate a prediction block of a target block. Further, after the prediction block has been generated, the encoding apparatus 100 may encode a residual between the target block and the prediction block.

When the prediction mode is the intra mode, the intra-prediction unit 120 may use pixels of previously encoded/decoded neighboring blocks around the target block as reference samples. The intra-prediction unit 120 may perform spatial prediction on the target block using the reference samples, and may generate prediction samples for the target block via spatial prediction.

The inter-prediction unit 110 may include a motion prediction unit and a motion compensation unit.

When the prediction mode is an inter mode, the motion prediction unit may search a reference image for the area most closely matching the target block in a motion prediction procedure, and may derive a motion vector for the target block and the found area based on the found area.

The reference image may be stored in the reference picture buffer 190. More specifically, the reference image may be stored in the reference picture buffer 190 when the encoding and/or decoding of the reference image have been processed.

The motion compensation unit may generate a prediction block for the target block by performing motion compensation using a motion vector. Here, the motion vector may be a two-dimensional (2D) vector used for inter-prediction. Further, the motion vector may indicate an offset between the target image and the reference image.

The motion prediction unit and the motion compensation unit may generate a prediction block by applying an interpolation filter to a partial area of a reference image when the motion vector has a value other than an integer. In order to perform inter prediction or motion compensation, it may be determined which one of a skip mode, a merge mode, an advanced motion vector prediction (AMVP) mode, and a current picture reference mode corresponds to a method for predicting the motion of a PU included in a CU, based on the CU, and compensating for the motion, and inter prediction or motion compensation may be performed depending on the mode.

The subtractor 125 may generate a residual block, which is the differential between the target block and the prediction block. A residual block may also be referred to as a "residual signal".

The residual signal may be the difference between an original signal and a prediction signal. Alternatively, the residual signal may be a signal generated by transforming or quantizing the difference between an original signal and a prediction signal or by transforming and quantizing the difference. A residual block may be a residual signal for a block unit.

The transform unit 130 may generate a transform coefficient by transforming the residual block, and may output the generated transform coefficient. Here, the transform coefficient may be a coefficient value generated by transforming the residual block.

The transform unit 130 may use one of multiple predefined transform methods when performing a transform.

The multiple predefined transform methods may include a Discrete Cosine Transform (DCT), a Discrete Sine Transform (DST), a Karhunen-Loeve Transform (KLT), etc.

The transform method used to transform a residual block may be determined depending on at least one of coding parameters for a target block and/or a neighboring block. For example, the transform method may be determined based on at least one of an inter-prediction mode for a PU, an intra-prediction mode for a PU, the size of a TU, and the shape of a TU. Alternatively, transformation information indicating the transform method may be signaled from the encoding apparatus 100 to the decoding apparatus 200.

When a transform skip mode is used, the transform unit 130 may omit transforming the residual block.

By applying quantization to the transform coefficient, a quantized transform coefficient level or a quantized level may be generated. Hereinafter, in the embodiments, each of the quantized transform coefficient level and the quantized level may also be referred to as a 'transform coefficient'.

The quantization unit 140 may generate a quantized transform coefficient level (i.e., a quantized level or a quantized coefficient) by quantizing the transform coefficient depending on quantization parameters. The quantization unit 140 may output the quantized transform coefficient level that is generated. In this case, the quantization unit 140 may quantize the transform coefficient using a quantization matrix.

The entropy encoding unit 150 may generate a bitstream by performing probability distribution-based entropy encoding based on values, calculated by the quantization unit 140, and/or coding parameter values, calculated in the encoding procedure. The entropy encoding unit 150 may output the generated bitstream.

The entropy encoding unit 150 may perform entropy encoding on information about the pixels of the image and information required to decode the image. For example, the information required to decode the image may include syntax elements or the like.

When entropy encoding is applied, fewer bits may be assigned to more frequently occurring symbols, and more bits may be assigned to rarely occurring symbols. As symbols are represented by means of this assignment, the size of a bit string for target symbols to be encoded may be reduced. Therefore, the compression performance of video encoding may be improved through entropy encoding.

Further, for entropy encoding, the entropy encoding unit 150 may use a coding method such as exponential Golomb, Context-Adaptive Variable Length Coding (CAVLC), or Context-Adaptive Binary Arithmetic Coding (CABAC). For example, the entropy encoding unit 150 may perform entropy encoding using a Variable Length Coding/Code (VLC) table. For example, the entropy encoding unit 150 may derive a binarization method for a target symbol. Further, the entropy encoding unit 150 may derive a probability model for a target symbol/bin. The entropy encoding unit 150 may perform arithmetic coding using the derived binarization method, a probability model, and a context model.

The entropy encoding unit 150 may transform the coefficient of the form of a 2D block into the form of a 1D vector through a transform coefficient scanning method so as to encode a quantized transform coefficient level.

The coding parameters may be information required for encoding and/or decoding. The coding parameters may include information encoded by the encoding apparatus 100 and transferred from the encoding apparatus 100 to a decoding apparatus, and may also include information that may be derived in the encoding or decoding procedure. For example, information transferred to the decoding apparatus may include syntax elements.

The coding parameters may include not only information (or a flag or an index), such as a syntax element, which is encoded by the encoding apparatus and is signaled by the encoding apparatus to the decoding apparatus, but also information derived in an encoding or decoding process. Further, the coding parameters may include information required so as to encode or decode images. For example, the coding parameters may include at least one value, combinations or statistics of the size of a unit/block, the depth of a unit/block, partition information of a unit/block, the partition structure of a unit/block, information indicating whether a unit/block is partitioned in a quad-tree structure, information indicating whether a unit/block is partitioned in a binary tree structure, the partitioning direction of a binary tree structure (horizontal direction or vertical direction), the partitioning form of a binary tree structure (symmetrical partitioning or asymmetrical partitioning), information indicating whether a unit/block is partitioned in a ternary tree structure, the partitioning direction of a ternary tree structure (horizontal direction or vertical direction), the partitioning form of a ternary tree structure (symmetrical partitioning or asymmetrical partitioning, etc.), information indicating whether a unit/block is partitioned in a complex tree structure, a combination and a direction (horizontal direction or vertical direction, etc.) of a partitioning of the complex tree structure, a prediction scheme (intra prediction or inter prediction), an intra-prediction mode/direction, a reference sample filtering method, a prediction block filtering method, a prediction block boundary filtering method, a filter tap for filtering, a filter coefficient for filtering, an inter-prediction mode, motion information, a motion vector, a reference picture index, an inter-prediction direction, an inter-prediction indicator, a reference picture list, a reference image, a motion vector predictor, a motion vector prediction candidate, a motion vector candidate list, information indicating whether a merge mode is used, a merge candidate, a merge candidate list, information indicating whether a skip mode is used, the type of an interpolation filter, the tap of an interpolation filter, the filter coefficient of an interpolation filter, the magnitude of a motion vector, accuracy of motion vector representation, a transform type, a transform size, information indicating whether a primary transform is used, information indicating whether an additional (secondary) transform is used, first transform selection information (or a first transform index), secondary transform selection information (or a secondary transform index), information indicating the presence or absence of a residual signal, a coded block pattern, a coded block flag, a quantization parameter, a quantization matrix, information about an intra-loop filter, information indicating whether an intra-loop filter is applied, the coefficient of an intra-loop filter, the tap of an intra-loop filter, the shape/form of an intra-loop filter, information indicating whether a deblocking filter is applied, the coefficient of a deblocking filter, the tap of a deblocking filter, deblocking filter strength, the shape/form of a deblocking filter, information indicating whether an adaptive sample offset is applied, the value of an adaptive sample offset, the category of an adaptive sample offset, the type of an adaptive sample offset, information indicating whether an adaptive in-loop filter is applied, the coefficient of an adaptive in-loop filter, the tap of an adaptive in-loop filter, the shape/form of an adaptive in-loop filter, a binarization/inverse binarization method, a context model, a context model decision method, a context model update method, information indicating whether a regular mode is performed, information whether a bypass mode is performed, a context bin, a bypass bin, a transform coefficient, a transform coefficient level, a transform coefficient level scanning method, an image display/output order, slice identification information, a slice type, slice partition information, tile identification information, a tile type, tile partition information, a picture type, bit depth, information about a luma signal, and information about a chroma signal. The prediction scheme may denote one prediction mode of an intra prediction mode and an inter prediction mode.

The first transform selection information may indicate a first transform which is applied to a target block.

The second transform selection information may indicate a second transform which is applied to a target block.

The residual signal may denote the difference between the original signal and a prediction signal. Alternatively, the residual signal may be a signal generated by transforming the difference between the original signal and the prediction signal. Alternatively, the residual signal may be a signal generated by transforming and quantizing the difference between the original signal and the prediction signal. A residual block may be the residual signal for a block.

Here, signaling a flag or an index may mean that the encoding apparatus 100 includes an entropy-encoded flag or an entropy-encoded index, generated by performing entropy encoding on the flag or index, in a bitstream, and that the decoding apparatus 200 acquires a flag or an index by performing entropy decoding on the entropy-encoded flag or the entropy-encoded index, extracted from the bitstream.

Since the encoding apparatus 100 performs encoding via inter prediction, the encoded target image may be used as a reference image for additional image(s) to be subsequently processed. Therefore, the encoding apparatus 100 may reconstruct or decode the encoded target image and store the reconstructed or decoded image as a reference image in the reference picture buffer 190. For decoding, dequantization and inverse transform on the encoded target image may be processed.

The quantized level may be inversely quantized by the dequantization unit 160, and may be inversely transformed by the inverse transform unit 170. The dequantization unit 160 may generate an inversely quantized coefficient by performing inverse transform for the quantized level. The inverse transform unit 170 may generate a reconstructed residual block by performing inverse transform for the inversely quantized coefficient. In other words, the reconstructed residual block is a coefficient that has been inversely quantized and inversely transformed.

The coefficient that has been inversely quantized and inversely transformed may be added to the prediction block by the adder 175. The inversely quantized and/or inversely transformed coefficient and the prediction block are added, and then a reconstructed block may be generated. Here, the inversely quantized and/or inversely transformed coefficient may denote a coefficient on which one or more of dequantization and inverse transform are performed, and may also denote a reconstructed residual block.

The reconstructed block may be subjected to filtering through the filter unit 180. The filter unit 180 may apply one or more of a deblocking filter, a Sample Adaptive Offset (SAO) filter, an Adaptive Loop Filter (ALF) and a Non Local Filter (NLF) to the reconstructed block or a reconstructed picture. The filter unit 180 may also be referred to as an "in-loop filter".

The deblocking filter may eliminate block distortion occurring at the boundaries between blocks. In order to determine whether to apply the deblocking filter, the number of columns or rows which are included in a block and which include pixel(s) based on which it is determined whether to apply the deblocking filter to a target block may be decided on.

When the deblocking filter is applied to the target block, the applied filter may differ depending on the strength of the required deblocking filtering. In other words, among different filters, a filter decided on in consideration of the strength of deblocking filtering may be applied to the target block. When a deblocking filter is applied to a target block, a filter corresponding to any one of a strong filter and a weak filter may be applied to the target block depending on the strength of required deblocking filtering.

Also, when vertical filtering and horizontal filtering are performed on the target block, the horizontal filtering and the vertical filtering may be processed in parallel.

The SAO may add a suitable offset to the values of pixels to compensate for coding error. The SAO may perform, for the image to which deblocking is applied, correction that uses an offset in the difference between an original image and the image to which deblocking is applied, on a pixel basis. To perform an offset correction for an image, a method for dividing the pixels included in the image into a certain number of regions, determining a region to which an offset is to be applied, among the divided regions, and applying an offset to the determined region may be used, and a method for applying an offset in consideration of edge information of each pixel may also be used.

The ALF may perform filtering based on a value obtained by comparing a reconstructed image with an original image. After pixels included in an image have been divided into a predetermined number of groups, filters to be applied to each group may be determined, and filtering may be differentially performed for respective groups. For a luma signal, information related to whether to apply an adaptive loop filter may be signaled for each CU. The shapes and filter coefficients of ALFs to be applied to respective blocks may differ for respective blocks. Alternatively, regardless of the features of a block, an ALF having a fixed form may be applied to the block.

A non-local filter may perform filtering based on reconstructed blocks, similar to a target block. A region similar to the target block may be selected from a reconstructed picture, and filtering of the target block may be performed using the statistical properties of the selected similar region. Information about whether to apply a non-local filter may be signaled for a Coding Unit (CU). Also, the shapes and filter coefficients of the non-local filter to be applied to blocks may differ depending on the blocks.

The reconstructed block or the reconstructed image subjected to filtering through the filter unit 180 may be stored in the reference picture buffer 190. The reconstructed block subjected to filtering through the filter unit 180 may be a part of a reference picture. In other words, the reference picture may be a reconstructed picture composed of reconstructed blocks subjected to filtering through the filter unit 180. The stored reference picture may be subsequently used for inter prediction.

Figure 2:
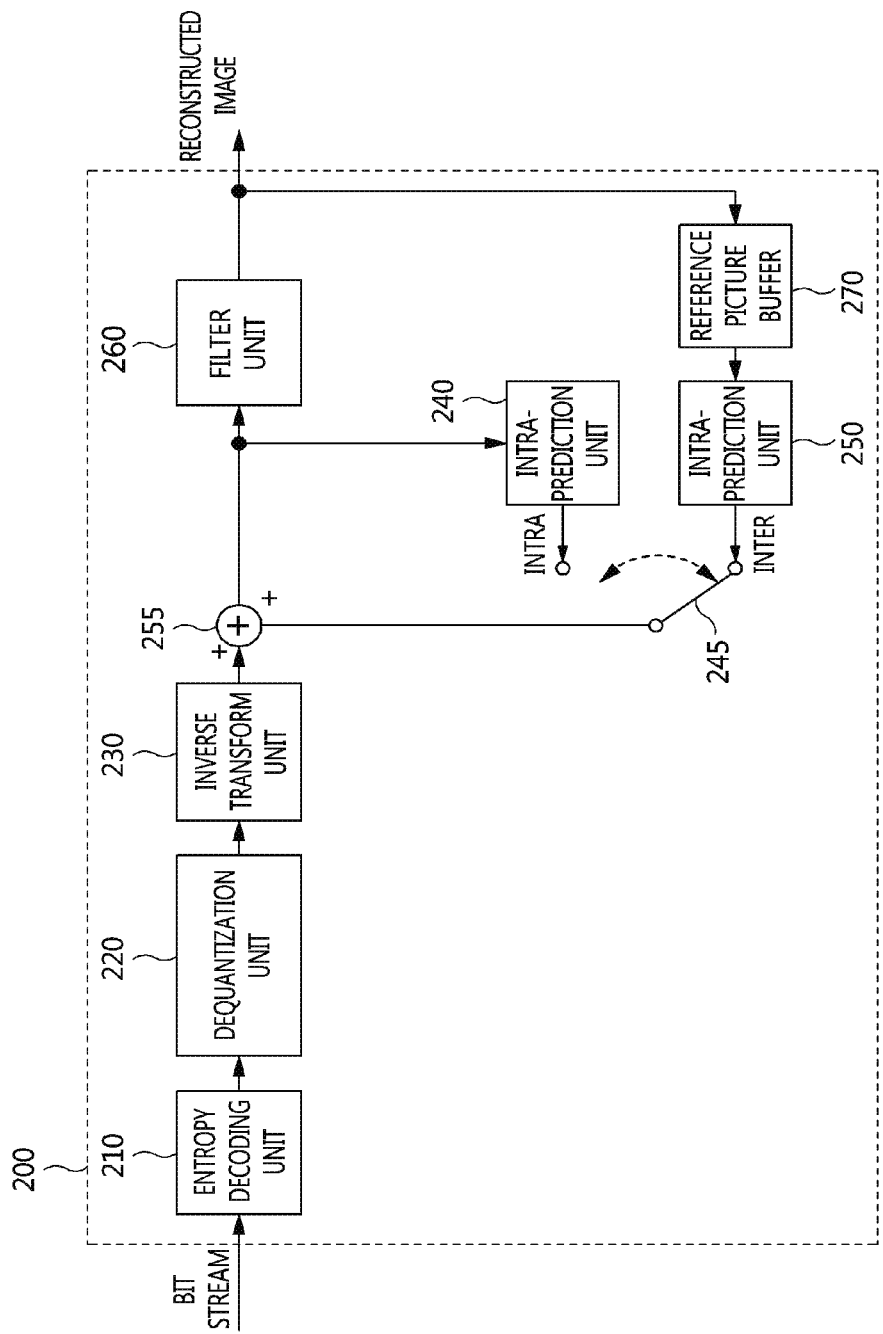
FIG. 2 is a block diagram illustrating the configuration of an embodiment of a decoding apparatus to which the present disclosure is applied.

FIG. 2 is a block diagram illustrating the configuration of an embodiment of a decoding apparatus to which the present disclosure is applied.

A decoding apparatus 200 may be a decoder, a video decoding apparatus or an image decoding apparatus.

Referring to FIG. 2, the decoding apparatus 200 may include an entropy decoding unit 210, a dequantization (inverse quantization) unit 220, an inverse transform unit 230, an intra-prediction unit 240, an inter-prediction unit 250, a switch 245 an adder 255, a filter unit 260, and a reference picture buffer 270.

The decoding apparatus 200 may receive a bitstream output from the encoding apparatus 100. The decoding apparatus 200 may receive a bitstream stored in a computer-readable storage medium, and may receive a bitstream that is streamed through a wired/wireless transmission medium.

The decoding apparatus 200 may perform decoding on the bitstream in an intra mode and/or an inter mode. Further, the decoding apparatus 200 may generate a reconstructed image or a decoded image via decoding, and may output the reconstructed image or decoded image.

For example, switching to an intra mode or an inter mode based on the prediction mode used for decoding may be performed by the switch 245. When the prediction mode used for decoding is an intra mode, the switch 245 may be operated to switch to the intra mode. When the prediction mode used for decoding is an inter mode, the switch 245 may be operated to switch to the inter mode.

The decoding apparatus 200 may acquire a reconstructed residual block by decoding the input bitstream, and may generate a prediction block. When the reconstructed residual block and the prediction block are acquired, the decoding apparatus 200 may generate a reconstructed block, which is the target to be decoded, by adding the reconstructed residual block to the prediction block.

The entropy decoding unit 210 may generate symbols by performing entropy decoding on the bitstream based on the probability distribution of a bitstream. The generated symbols may include symbols in a form of a quantized transform coefficient level (i.e., a quantized level or a quantized coefficient). Here, the entropy decoding method may be similar to the above-described entropy encoding method. That is, the entropy decoding method may be the reverse procedure of the above-described entropy encoding method.

The entropy decoding unit 210 may change a coefficient having a one-dimensional (1D) vector form to a 2D block shape through a transform coefficient scanning method in order to decode a quantized transform coefficient level.

For example, the coefficients of the block may be changed to 2D block shapes by scanning the block coefficients using up-right diagonal scanning. Alternatively, which one of up-right diagonal scanning, vertical scanning, and horizontal scanning is to be used may be determined depending on the size and/or the intra-prediction mode of the corresponding block.

The quantized coefficient may be inversely quantized by the dequantization unit 220. The dequantization unit 220 may generate an inversely quantized coefficient by performing dequantization on the quantized coefficient. Further, the inversely quantized coefficient may be inversely transformed by the inverse transform unit 230. The inverse transform unit 230 may generate a reconstructed residual block by performing an inverse transform on the inversely quantized coefficient. As a result of performing dequantization and the inverse transform on the quantized coefficient, the reconstructed residual block may be generated. Here, the dequantization unit 220 may apply a quantization matrix to the quantized coefficient when generating the reconstructed residual block.

When the intra mode is used, the intra-prediction unit 240 may generate a prediction block by performing spatial prediction that uses the pixel values of previously decoded neighboring blocks around a target block.

The inter-prediction unit 250 may include a motion compensation unit. Alternatively, the inter-prediction unit 250 may be designated as a "motion compensation unit".

When the inter mode is used, the motion compensation unit may generate a prediction block by performing motion compensation that uses a motion vector and a reference image stored in the reference picture buffer 270.

The motion compensation unit may apply an interpolation filter to a partial area of the reference image when the motion vector has a value other than an integer, and may generate a prediction block using the reference image to which the interpolation filter is applied. In order to perform motion compensation, the motion compensation unit may determine which one of a skip mode, a merge mode, an Advanced Motion Vector Prediction (AMVP) mode, and a current picture reference mode corresponds to the motion compensation method used for a PU included in a CU, based on the CU, and may perform motion compensation depending on the determined mode.

The reconstructed residual block and the prediction block may be added to each other by the adder 255. The adder 255 may generate a reconstructed block by adding the reconstructed residual block to the prediction block.

The reconstructed block may be subjected to filtering through the filter unit 260. The filter unit 260 may apply at least one of a deblocking filter, an SAO filter, an ALF, and a NLF to the reconstructed block or the reconstructed image. The reconstructed image may be a picture including the reconstructed block.

The reconstructed image subjected to filtering may be outputted by the encoding apparatus 100, and may be used by the encoding apparatus.

The reconstructed image subjected to filtering through the filter unit 260 may be stored as a reference picture in the reference picture buffer 270. The reconstructed block subjected to filtering through the filter unit 260 may be a part of the reference picture. In other words, the reference picture may be an image composed of reconstructed blocks subjected to filtering through the filter unit 260. The stored reference picture may be subsequently used for inter prediction.

Figure 3:
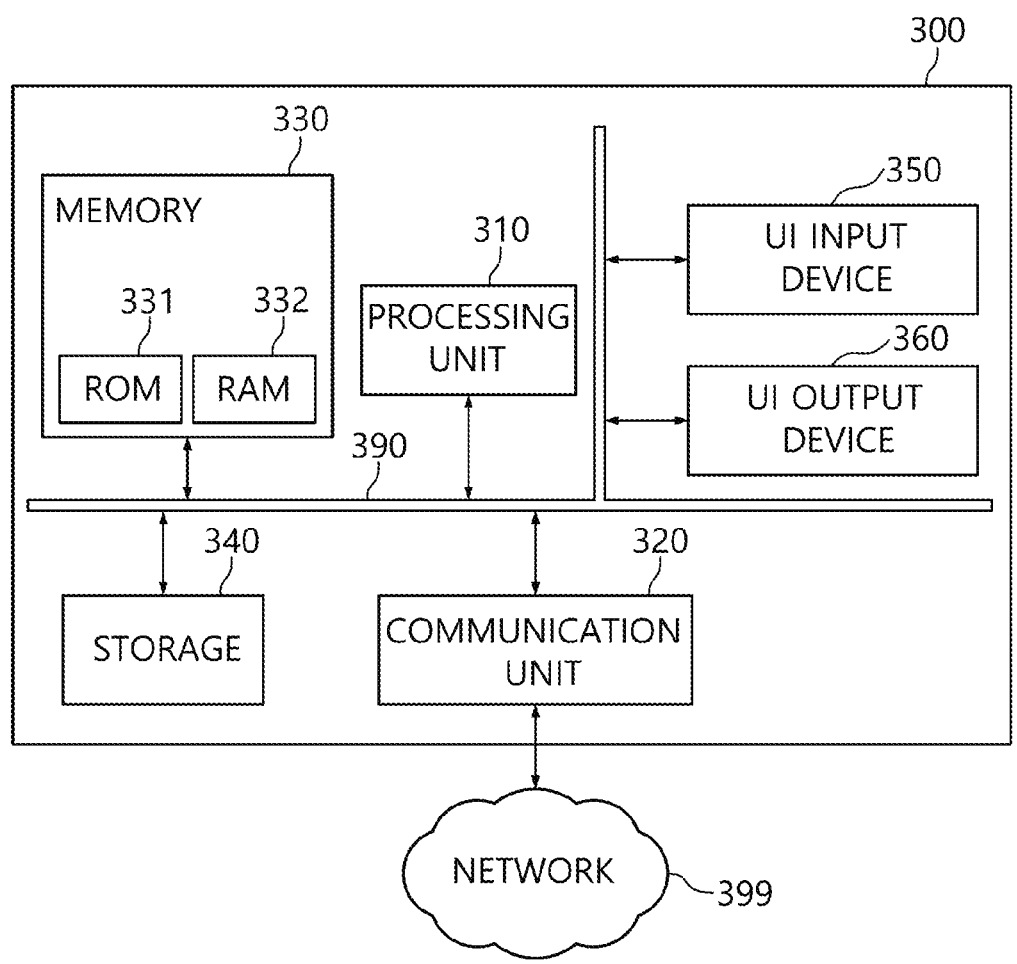
FIG. 3 is a block diagram of an electronic device according to an embodiment.

FIG. 3 is a block diagram of an electronic device according to an embodiment.

The electronic device 300 may correspond to the encoding apparatus 100 and decoding apparatus 200, which are described above. That is, the electronic device 300 may perform the above-described encoding function of the encoding apparatus 100 and the above-described decoding function of the decoding apparatus 200.

The electronic device 300 may include a processing unit 310, memory 330, a User Interface (UI) input device 350, a UI output device 360, and storage 340, which communicate with each other via a bus 390. Also, the electronic device 300 may further include a communication unit 320 connected with a network 399.

The processing unit 310 may be a central processing unit (CPU) or a semiconductor device for executing processing instructions stored in the memory 330 or the storage 340. The processing unit 310 may be at least one hardware processor.

The processing unit 310 may generate and process a signal, data or information that is input to the electronic device 300, output therefrom, or used therein, and may perform checking, comparison, and determination related to the signal, the data, or the information. In other words, in an embodiment, the generation and processing of data or information and checking, comparison, and determination related to the data or the information may be performed by the processing unit 310.

The processing unit 310 may include an inter-prediction unit 110, an intra-prediction unit 120, a switch 115, a subtractor 125, a transform unit 130, a quantization unit 140, an entropy coding unit 150, a dequantization unit 160, an inverse-transform unit 170, an adder 175, a filter unit 180, and a reference picture buffer 190.

Also, the processing unit 310 may include an entropy decoding unit 210, a dequantization unit 220, an inverse-transform unit 230, an intra-prediction unit 240, an inter-prediction unit 250, a switch 245, an adder 255, a filter unit 260, and a reference picture buffer 270.

At least some of the inter-prediction unit 110, the intra-prediction unit 120, the switch 115, the subtractor 125, the transform unit 130, the quantization unit 140, the entropy coding unit 150, the dequantization unit 160, the inverse-transform unit 170, the adder 175, the filter unit 180, and the reference picture buffer 190 may be program modules, and may communicate with an external device or system. The program modules in the form of an operating system, an application module, and other program modules may be included in the electronic device 300.

Also, at least some of the entropy decoding unit 210, the dequantization unit 220, the inverse-transform unit 230, the intra-prediction unit 240, the inter-prediction unit 250, the switch 245, the adder 255, the filter unit 260, and the reference picture buffer 270 may be program modules, and may communicate with an external device or system. The program modules in the form of an operating system, an application module, and other program modules may be included in the electronic device 300.

The program modules may be physically stored in various known memory devices. Also, at least some of these program modules may be stored in a remote memory device that is capable of communicating with the electronic device 300.

The program modules may include a routine, a subroutine, a program, an object, a component, a data structure, and the like for executing a function or operation according to an embodiment or implementing an abstract data type according to an embodiment, but the program modules are not limited thereto.

The program modules may be configured with instructions or code executed by at least one processor of the electronic device 300.

The processing unit 310 may execute the instructions or code of the inter-prediction unit 110, the intra-prediction unit 120, the switch 115, the subtractor 125, the transform unit 130, the quantization unit 140, the entropy coding unit 150, the dequantization unit 160, the inverse-transform unit 170, the adder 175, the filter unit 180, and the reference picture buffer 190.

Also, the processing unit 310 may execute the instructions or code of the entropy decoding unit 210, the dequantization unit 220, the inverse-transform unit 230, the intra-prediction unit 240, the inter-prediction unit 250, the switch 245, the adder 255, the filter unit 260, and the reference picture buffer 270.

"Storage unit" may indicate the memory 330 and/or the storage 340. The memory 330 and the storage 340 may be various types of volatile or nonvolatile storage media. For example, the memory 330 may include at least one of ROM 331 and RAM 332.

The storage unit may store data or information that is used for the operation of the electronic device 300. In an embodiment, data or information of the electronic device 300 may be stored in the storage unit.

For example, the storage unit may store pictures, blocks, lists, movement information, inter-prediction information, bitstreams, and the like.

The electronic device 300 may be implemented in a computer system including a computer-readable recording medium.

The recording medium may store at least one module required for the operation of the electronic device 300. The memory 330 may store at least one module, and may be configured such that the at least one module is executed by the processing unit 310.

The functions related to the transmission and reception of the data or information of the electronic device 300 may be performed through the communication unit 320.

For example, the communication unit 320 may transmit a bitstream to another electronic device.

Figure 4:
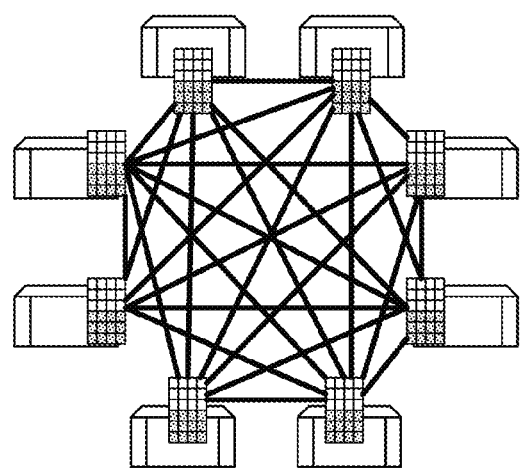
FIG. 4 shows sharing of a parameter based on full mesh topology according to an example.
Figure 4:
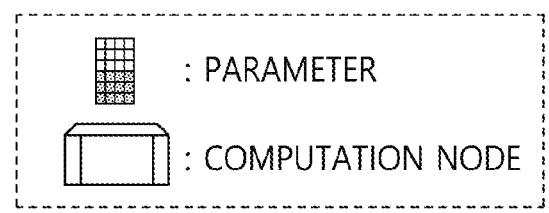

FIG. 4 shows sharing of a parameter based on full mesh topology according to an example.

In FIG. 4, multiple computation nodes among which parameters are shared are illustrated. The computation node may be the above-described electronic device 300. That is, the computation node may be the electronic device 300 that performs distributed processing in a distributed processing system.

Hereinafter, the terms "parameter", "learning parameter", "weight parameter", and "kernel parameter" may have the same meaning or similar meanings. Also, these terms may be used interchangeably with each other. Also, "parameter" may indicate "weight".

Hereinafter, the terms "learning" and "training" may have the same meaning. Also, these terms may be used interchangeably with each other.

Figure 5:
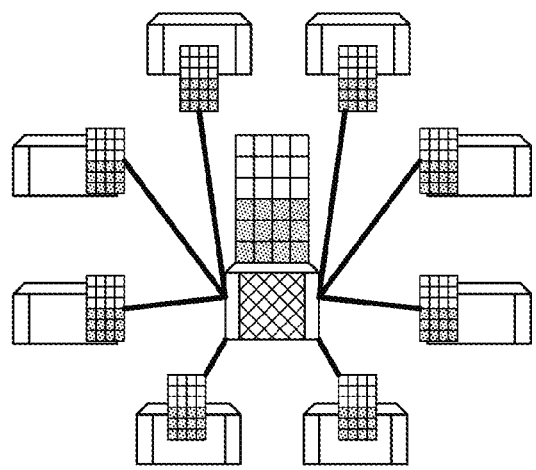
FIG. 5 shows sharing of a parameter based on star topology according to an example.
Figure 5:
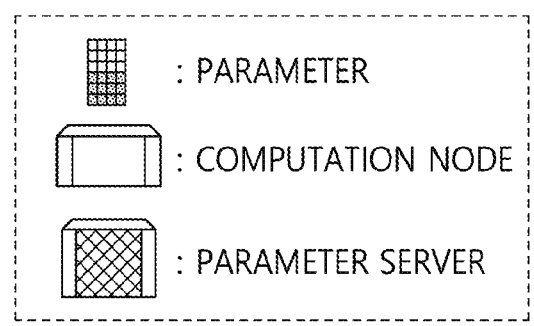

FIG. 5 shows sharing of a parameter based on star topology according to an example.

In FIG. 5, multiple computation nodes, among which parameters are shared, and a parameter server, which is used as a shared place for sharing the parameters, are illustrated.

In order to perform training of a deep-learning model in a distributed manner, it is necessary to share the parameters of the deep-learning model among multiple computation nodes in the training process.

As a method for sharing the parameters, a sharing method based on full mesh topology and a sharing method based on star topology may be used.

When the sharing method based on full mesh topology is used, one computation node may transmit a parameter directly to all of the other computation nodes.

When the sharing method based on star topology is used, all of the computation nodes may read and write parameters using a parameter server, which is a shared place.

When the sharing method based on star topology is used, the parameter server at the center may manage the update and sharing of the parameters. Accordingly, storage that is used for sharing the parameters is required to control concurrency and synchronization. Whenever an epoch, which is one learning cycle for given data, is iterated, it may be required to synchronize the parameters between the computation nodes.

Both of the sharing methods are problematic in that an increase in the number of computation nodes that configure topology may cause an increase in the number of times the computation nodes communicate with each other in order to share the parameters. Particularly, when the sharing method based on full mesh topology is used, the number of times that communication, required for sharing the parameters, is performed may be proportional to the square of the number of computation nodes.

Generally, in order to adjust a gradient with respect to the weight parameter set $\theta$ of a deep-learning network, a gradient descent approach is used.

In the gradient descent approach, the energy function $J(\theta)$ may be used to define the difference between the predicted value of the deep-learning network and an actual result value. The gradient descent approach may be a process of learning $\theta$ using the gradient $\nabla J(\theta)$ in order to minimize the energy function $J(\theta)$.

For example, learning of $\theta$ in the gradient descent approach may be represented as shown in the following Equation 2.

$$\theta_{t+1} = \theta_t - \mu \nabla J(\theta_t) = \theta_t + \Delta\theta_t \quad \text{[Equation 2]}$$

$\theta_t$ may be a parameter set in t-th learning. When t is sufficiently large, $\theta_t$ is expected to converge to the optimum parameter set $\theta_{opt}$. $\mu$ may be a step size.

The number of parameters in the parameter set of a deep-learning model may exceed hundreds of thousands. Also, a huge amount of input data may be used for training of the deep-learning model, and the number of iterations required for training using such a huge amount of input data may also exceed thousands of times. Depending on the number of parameters, the amount of input data, and the number of iterations, the operations in Equation 2 may be required to be repeatedly performed a large number of times in order to perform training of the deep-learning model.

According to the existing learning model and parameter-sharing method that are used for distributed training of a large-scale deep-learning model, the number of parameters that should be shared between computation nodes may sharply increase with an increase in the number of distributed computers in a distributed processing system and with repetition of learning of a kernel parameter based on the gradient descent algorithm.

Here, a network latency problem caused by sharing a huge number of parameters using the limited bandwidth of a network may slow down the entire learning process. Also, the size of the storage space of a computation node, which is required for sharing such a huge number of parameters, may also be increased.

In an embodiment, an efficient distributed learning algorithm for compressing parameters to be shared and transmitting the compressed parameters may be provided.

In an embodiment, a distributed computer that transmits a parameter (that is, an encoding apparatus) may generate a coded residual by performing predictive coding only for the residual of the trained parameter. A distributed computer that receives the parameter (that is, a decoding apparatus) may reconstruct the parameter using the received coded residual and the previous parameter.

The embodiment may also be applied in the case in which a parameter server at the center transmits a parameter trained in one distributed computer to multiple distributed computers.

Figure 6:
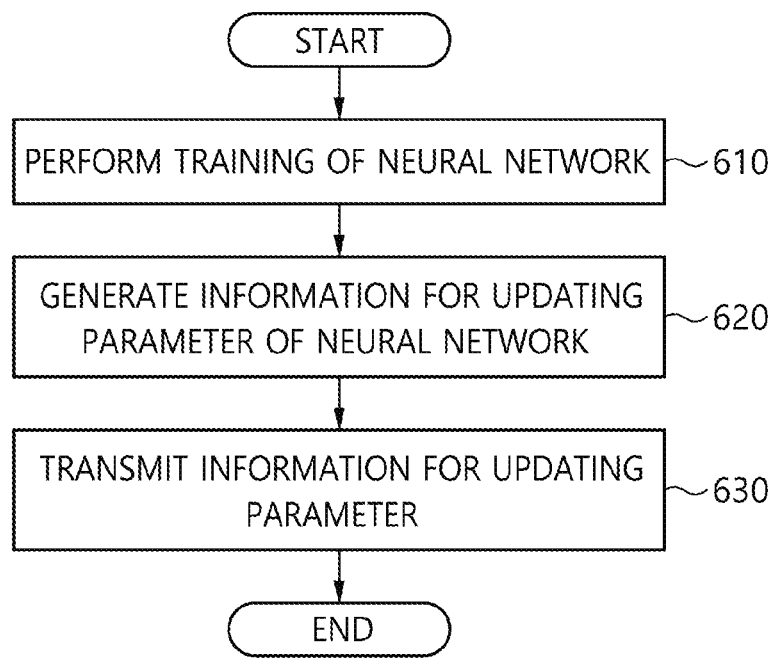
FIG. 6 is a flowchart of a method for providing information about an updated parameter according to an embodiment.

FIG. 6 is a flowchart of a method for providing information about an updated parameter according to an embodiment.

In an embodiment, the electronic device 300 may function as the encoding apparatus 100.

A distributed processing system may include multiple electronic devices through which training of a neural network is performed in a distributed manner. Hereinafter, the electronic device 300 may be one of the multiple electronic devices. That is, the following embodiment may describe operations performed in one of the multiple electronic devices in the distributed processing system.

At step 610, the processing unit 310 of the electronic device 300 in the distributed processing system may perform training of a neural network.

The neural network may be a neural network for deep learning.

The parameter of the neural network may be updated by performing training.

At step 620, the processing unit 310 of the electronic device 300 may generate information for updating the parameter of the neural network.

The information for updating the parameter of the neural network may be information for sharing the parameter updated in the electronic device 300 with other electronic devices.

The processing unit 310 may generate information for updating the parameter based on the state of the parameter that is updated by performing training and the previous state thereof before training is performed.

Here, the state of the parameter may indicate the value of the parameter. That is, the processing unit 310 may generate information for updating the parameter based on the value of the parameter that is updated by performing training and the previous value thereof before training is performed.

The information for updating the parameter may include the residual of the parameter. The residual of the parameter may be the difference between the value of the parameter that is updated by performing training and the previous value of the parameter before training is performed. The processing unit 310 may generate information for updating the parameter based on the residual of the parameter.

At step 630, the communication unit 320 of the electronic device 300 may transmit the information for updating the parameter to an additional device in the distributed processing system.

The communication unit 320 of the electronic device 300 may transmit a bitstream to the additional device in the distributed processing system. The bitstream may include the information for updating the parameter.

The additional device may comprise one or more other electronic devices that perform training of the neural network in the distributed processing system.

The additional device may be a parameter server in the distributed processing system. The parameter server may transmit the information for updating the parameter to one or more other electronic devices that perform training of the neural network in the distributed processing system.

Figure 7:
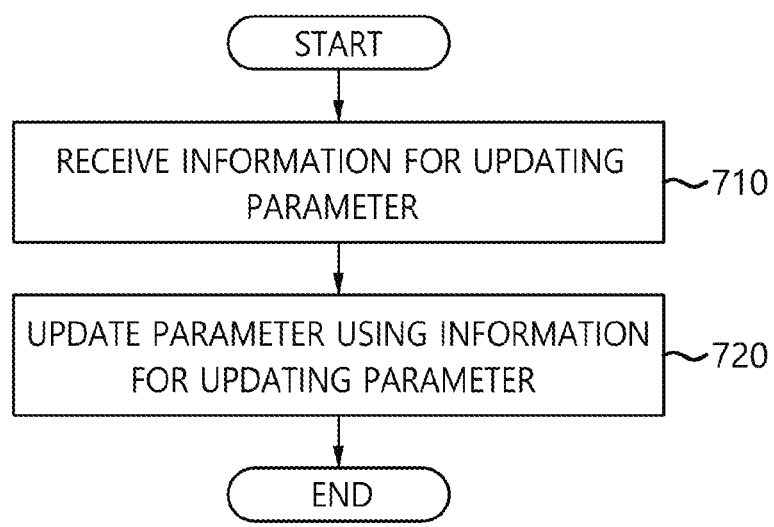
FIG. 7 is a flowchart of a method for updating a parameter using information about an updated parameter according to an embodiment.

FIG. 7 is a flowchart of a method for updating a parameter using information about an updated parameter according to an embodiment.

A distributed processing system may include multiple electronic devices that perform training of a neural network in a distributed manner. Hereinafter, the electronic device 300 may be one of the multiple electronic devices. That is, the following embodiment may describe operations performed in one of the multiple electronic devices in the distributed processing system.

In the embodiment, the electronic device 300 may function as the decoding apparatus 200.

At step 710, the communication unit 320 of the electronic device 300 may receive information for updating a parameter from an additional device in the distributed processing system.

The communication unit 320 of the electronic device 300 may receive a bitstream from the additional device in the distributed processing system. The bitstream may include the information for updating the parameter.

The additional device may be another electronic device that performs training of the neural network in the distributed processing system.

The additional device may be a parameter server in the distributed processing system. The parameter server may receive information for updating the parameter from another electronic device that performs training of the neural network in the distributed processing system. The parameter server may transmit the information for updating the parameter to the electronic device 300.

At step 720, the processing unit 310 may update the parameter using the information for updating the parameter.

The information for updating the parameter may be information for sharing the update of the parameter with the electronic device 300 when the parameter is updated, by which another electronic device performs training.

The information for updating the parameter may include the residual of the parameter. The residual of the parameter may be the difference between the value of the parameter updated by performing training in another electronic device and the previous value of the parameter before training is performed.

The processing unit 310 may generate the residual of the parameter based on the information for updating the parameter. The processing unit 310 may update the parameter by adding the residual of the parameter thereto.

Figure 8:
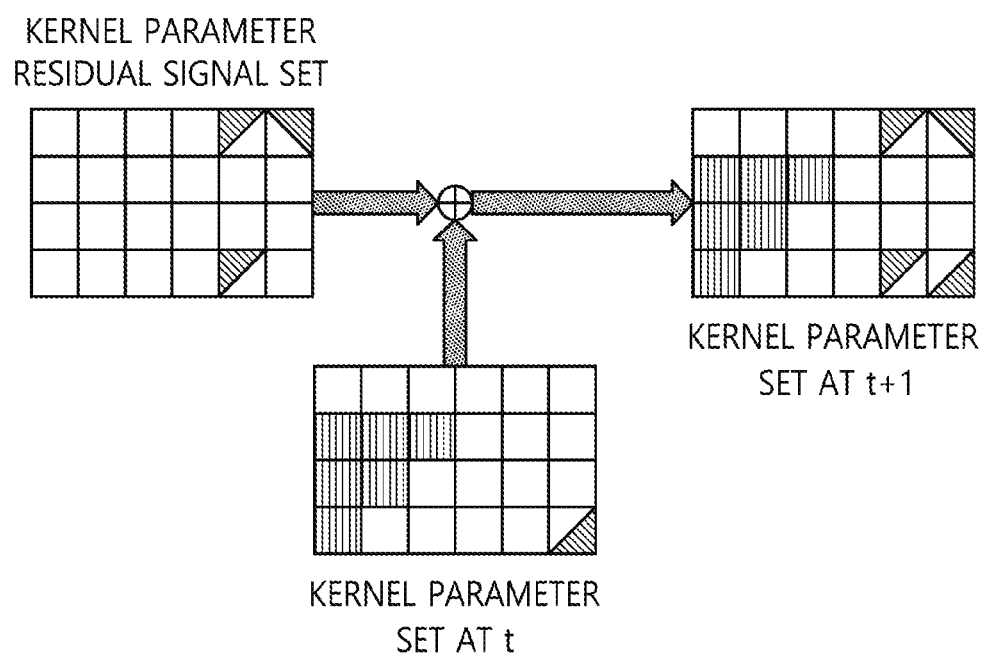
FIG. 8 shows the update of a parameter set in deep learning according to an example.

FIG. 8 shows the update of a parameter set in deep learning according to an example.

FIG. 8 illustrates that the existing kernel parameter set at time 't' and a kernel parameter residual signal set are added, whereby a kernel parameter set at time 't+1' is generated. That is, using the kernel parameter residual signal set, a kernel parameter set at a specified time point may be updated to a kernel parameter set at the next time point. Here, the kernel parameter residual signal set may be information received using a bitstream from an additional electronic device, and may be information generated as a result of training of the neural network in the additional electronic device.

In the embodiment described above with reference to FIG. 6 and the embodiment described above with reference to FIG. 7, the parameter to be updated may comprise multiple parameters.

The multiple parameters may configure a parameter set. The information for parameter update, which is described with reference to FIG. 7 and FIG. 8, may be the residual signal set of the multiple parameters. Alternatively, the information for parameter update may include the residual signal set of the multiple parameters. Alternatively, the information for parameter update may be generated based on the residual signal set of the multiple parameters, or conversely, the residual signal set of the multiple parameters may be generated based on the information for parameter update.

Here, the multiple parameters may be deep-learning parameters that configure one of the layers of the deep-learning model.

The electronic device 300 may acquire the residual signal set of the multiple parameters by performing decoding for the bitstream.

The residual signal may correspond to $\Delta\theta_t$ in Equation 2.

Whenever training is iterated, $\theta_{t+1}$ may be updated from $\theta_t$.

The residuals of the multiple parameters may be compressed. That is, the information for parameter update may include the compressed residuals of the multiple parameters. Because the size of an update to $\theta_{t+1}$ is not large, the compressed $\Delta\theta_t$ is transmitted, rather than the compressed $\theta_{t+1}$, whereby the amount of data that is transmitted may be reduced.

For example, at step 620, the processing unit 310 of the electronic device 300 may generate compressed residuals of the multiple parameters by performing encoding for the residuals of the multiple parameters, and may generate information for parameter update including the compressed residuals of the multiple parameters.

The processing unit 310 of the electronic device 300 may reconstruct $\theta_{t+1}$ by adding the decoded $\Delta\theta_t$ to $\theta_t$, which already exists therein.

For example, at step 720, the processing unit 310 may acquire the residuals of the multiple parameters by performing decoding for the compressed residuals of the multiple parameters, which are included in the information for parameter update, and may update the multiple parameters using the residuals thereof.

When it comes to encoding and decoding of the residuals of the multiple parameters, the above-described methods for encoding and decoding of the block of an image may be used. That is, the multiple parameters may be regarded as a target block. The values of the multiple parameters may be regarded as the samples of the target block, and the residuals of the multiple parameters may be regarded as a residual block for the target block.

In the convolution layer of a CNN, the parameters of an N×N kernel block may be trained. Filtering may be applied to the trained kernel parameters, and the kernel parameters to which filtering is applied may be used to generate a feature map of the next layer.

Generally, in a CNN, not training of a single kernel parameter but training of multiple kernel parameters in each layer may be performed. By performing training of the multiple kernel parameters, a parameter set may be configured.

In FIG. 8, 24 kernel parameters, which configure one of the layers of a CNN, are represented as 24 blocks. That is, a block may correspond to a kernel parameter, and the kernel parameter may correspond to the block. The size of the block may be N×N. The blocks may have the same size. The 24 blocks may configure an image. Through the processes in the embodiment, the kernel parameter set may converge to a form having less noise after a sufficient number of iterations.

As described above, the parameter set may include multiple parameters, and each of the multiple parameters may correspond to a block. That is, the parameter set may include multiple blocks. Also, the multiple blocks may be the same size.

The parameter set may be regarded as a target image including multiple blocks. That is, the block may comprise multiple blocks, and the multiple blocks may configure the target image. The method for processing the target image, which has been described in the above embodiments, may also be applied in the present embodiment. Here, the processing method may include encoding and decoding.

For example, at step 720, the processing unit 310 may acquire the residuals of the multiple parameters by performing decoding for the compressed residuals of the multiple parameters, which are included in the information for parameter update, and may update the multiple parameters using the residuals of the multiple parameters. Here, the multiple blocks may configure a target image, and the method for decoding the target image described in the above embodiments may be used when decoding is performed.

A block in the target image may be regarded as the target block described in the above embodiments. The method for processing the target block, described in the above embodiments, may also be applied to the block described in the present embodiment. Here, the processing method may include encoding and decoding.

Here, in order to perform parameter encoding, the electronic device 300 may use one or more of transform, quantization, scanning, and entropy coding for a block or a signal. Also, in order to perform parameter decoding, the electronic device 300 may use one or more of entropy decoding, scanning, dequantization, and inverse transform for a block or a signal. When such encoding or decoding is performed, at least some processes may be modified and/or omitted.

Figure 9:
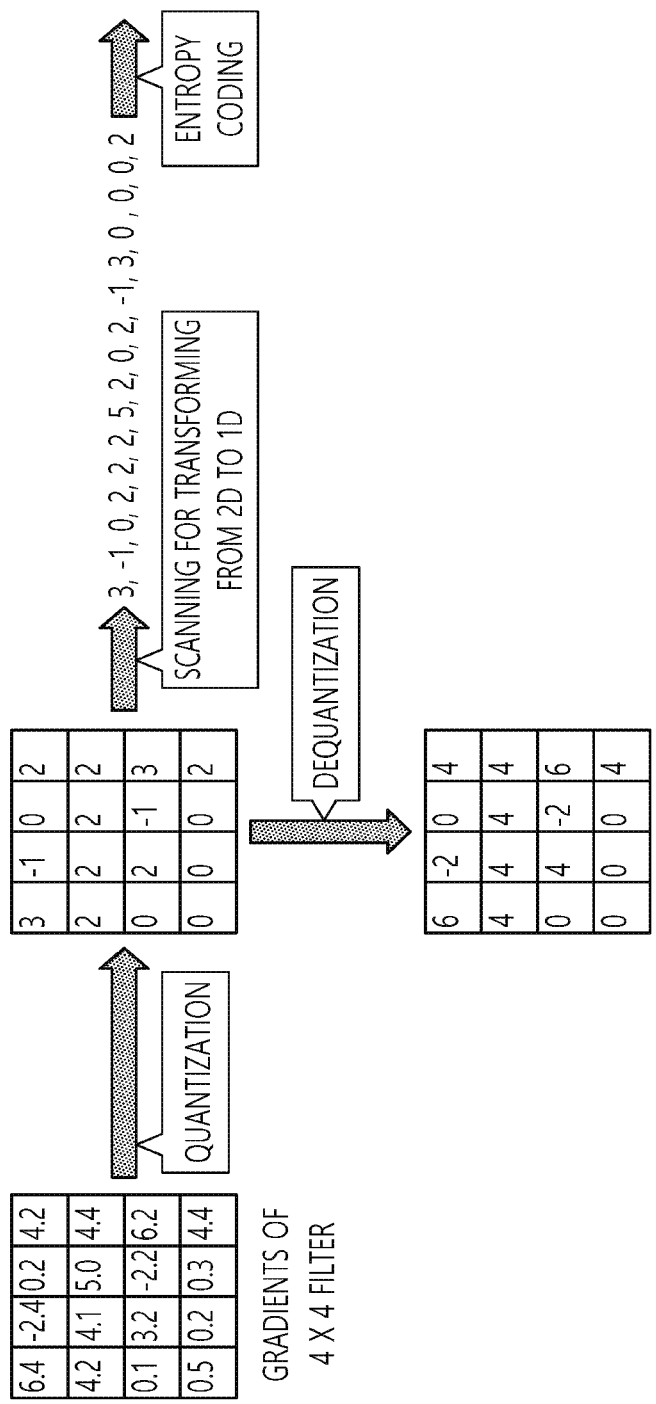
FIG. 9 shows the process of quantization, raster scanning, and entropy coding according to an example.

FIG. 9 shows the processes of quantization, raster scanning, and entropy coding according to an example.

A block may correspond to the gradients of a filter having a specified size.

In FIG. 9, quantized gradients, which are the result of quantization for the gradients of a 4×4 filter, and dequantized gradients, which are the result of dequantization for the quantized gradients, are illustrated. Here, the filter may indicate a kernel. The gradient may indicate a residual signal, which is $\Delta\theta_t$.

The quantized gradient may be referred to as a quantized index.

Also, in FIG. 9, scanning (a raster scan) is applied in order to transform the quantized gradients from two dimensions (2D) into 1D, whereby quantized gradients scanned into a 1D sequence are generated. Entropy coding is applied to the quantized gradients, which are scanned into a 1D sequence, whereby entropy-coded quantized gradients may be generated.

For example, information for parameter update may include the entropy-coded quantized gradients.

For example, at step 620, the processing unit 310 of the electronic device 300 may generate quantized gradients by performing quantization for the gradients of a filter. The processing unit 310 scans the 2D quantized gradients into a 1D sequence, thereby generating scanned information. The scanned information may include the scanned quantized gradients. The processing unit 310 performs entropy coding for the scanned information, thereby generating information for parameter update. The information for parameter update may indicate the entropy-coded quantized gradients.

For example, at step 720, the processing unit 310 of the electronic device 300 may acquire information for parameter update from a bitstream. The processing unit 310 performs entropy decoding for the information for parameter update, thereby generating scanned information. That is, the processing unit 310 may generate the scanned information based on the information for parameter update. The scanned information may include scanned quantized gradients. The processing unit 310 performs 1D-to-2D scanning for the scanned information, thereby generating quantized gradients.

The processing unit 310 performs dequantization for the quantized gradients, thereby generating reconstructed gradients. The reconstructed gradients may be the residuals of the multiple parameters.

Figure 10:
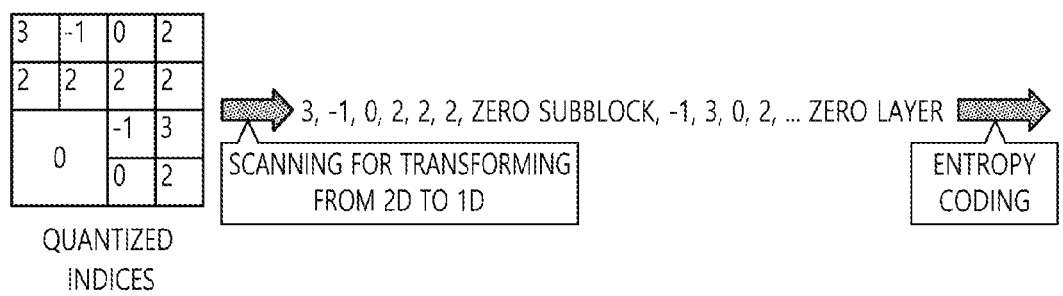
FIG. 10 shows entropy coding using a zero subblock and a zero layer according to an example.

FIG. 10 shows entropy coding using a zero subblock and a zero layer according to an example.

When training of a neural network is iterated, the result of training, which is performed as shown in Equation 2, may converge. When $\Delta\theta_t$ becomes sufficiently small through convergence, the distribution of '0's among the quantized indices (namely, the quantized gradients) of a block may change in the current iteration. For example, when training of the neural network is iterated, the number of quantized gradients having a value of 0 in the block may be increased.

With such an increase, the values of all of the quantized indices of a specified region in the block may become 0, or the values of the quantized indices of the specified region in the block may not need to be shared. When the values of all of the quantized indices of the specified region are 0 or when the values of the quantized indices of the specified regions need not be shared, the specified region may be regarded as a zero subblock consisting of '0's. The scanned information may include the zero subblock for the specified region. In FIG. 10, the zero subblock included in the scanned information is illustrated as "(zero subblock)".

For example, at step 620, when the values of all of the quantized gradients in the subblock of a specified region are 0, the processing unit 310 of the electronic device 300 may generate a zero subblock in order to replace the quantized gradients having a value of 0. Instead of the quantized gradients having a value of 0 in the specified subblock, the zero subblock may be included in the scanned information. Here, the zero subblock may indicate the specified region in the block, and may indicate that the values of all of the quantized gradients in the specified region are 0.

For example, at step 720, when a zero subblock is present in the scanned information, the processing unit 310 of the electronic device 300 may fill the specified region indicated by the zero subblock with '0's as the values of the quantized gradients therein.

Also, with such an increase in the number of quantized gradients having a value of 0, the values of all of the quantized indices of the block may become 0, or the values of the quantized indices of the block may not need to be shared. When the values of all of the quantized indices of the block are 0 or when the values of the quantized indices of the block need not be shared, the block may be regarded as a zero block consisting of '0's. In this case, a zero block may replace the scanned quantized gradients for the block.

For example, at step 620, when the values of all of the quantized gradients of a block are 0 or when the values of the quantized gradients of the block need not be shared, the processing unit 310 of the electronic device 300 may generate a zero block in order to replace the scanned quantized gradients having a value of 0. The scanned information may include the zero block. The zero block may indicate that the values of all of the quantized gradients in the block are 0.

For example, at step 720, when the scanned information for the block is a zero block, the processing unit 310 of the electronic device 300 may fill the block with '0's as the values of the quantized gradients therein.

Also, with such an increase in the number of quantized gradients having a value of 0, the values of all of the parameters of a layer may become 0, or the values of the parameters of the layer may not need to be shared. When the values of all of the specified parameters are 0 or when the values of the parameters of a layer need not be shared, a zero layer may be transmitted, rather than the quantized gradients for the layer. The zero layer may indicate that all of the blocks of the layer are zero blocks. That is, the zero layer may indicate that all of the quantized gradients of all of the blocks of the layer have a value of 0. In FIG. 10, the zero layer included in the scanned information is illustrated as "(zero layer)".

For example, at step 620, when the values of all of the parameters of a layer are 0 or when the values of the parameters of the layer need not be shared, the processing unit 310 of the electronic device 300 may generate a zero layer in order to replace the scanned quantized gradients of the blocks of the layer. The scanned information may include the zero layer. The zero layer may indicate that the values of all of the quantized gradients of the blocks of the layer are 0.

For example, at step 720, when scanned information for a layer is a zero layer, the processing unit 310 of the electronic device 300 may fill all of the blocks of the layer with '0's as the values of the quantized gradients therein.

As described above, whether it is necessary to share specified information may be determined based on the performance of a network between computation nodes.

The electronic device 300 functioning as the decoding apparatus 200 may predict the performance of a network with respect to transmission of information about parameters and determine whether to transmit information for sharing parameters based on the predicted performance. Here, the parameters may be the quantized gradients of a subblock, the quantized gradients of a block, and/or the quantized gradients of a layer.

For example, when a network is used for classification of images, the electronic device 300 may determine whether to transmit parameters such that the cost function J in the following Equation (3) is minimized.

$$J = C + \lambda B \qquad \text{[Equation 3]}$$

C may be the classification performance of the network. B may be the number of bits required for transmission of parameters. $\lambda$ may be a constant.

The processing unit 310 of the electronic device 300 may determine whether to transmit parameters such that the cost function J is minimized. Alternatively, the processing unit 310 may include a zero subblock, a zero block, or a zero layer in the scanned information such that the cost function J is minimized.

Figure 11:
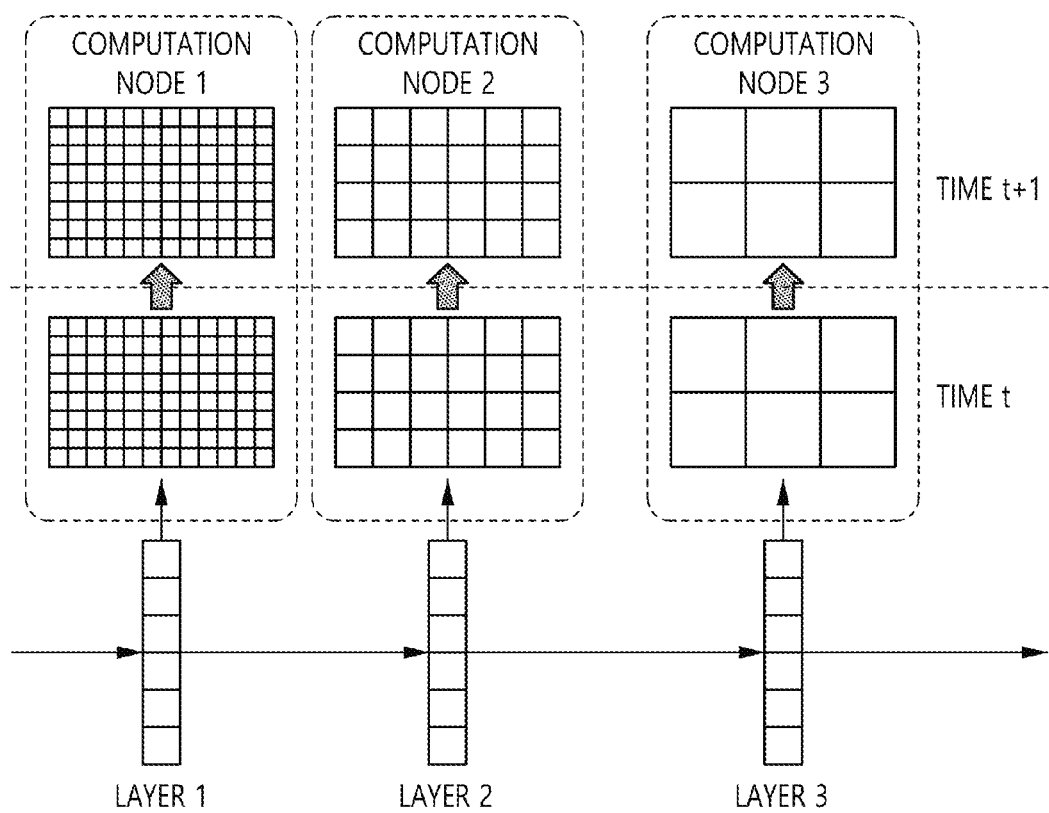
FIG. 11 shows sharing of a parameter in a model parallelism approach according to an example.

FIG. 11 shows sharing of parameters in a model parallelism approach according to an example.

In the model parallelism approach, a single computation node may not process a large-scale deep-learning model. In the model parallelism approach, the electronic device 300 is required to share a parameter calculated for a portion of the deep-learning model with additional electronic devices after each iteration.

Whenever training of a neural network is iterated, the electronic device 300 may update the parameter for the portion of the deep-learning model through training thereof and share the updated parameter with the additional electronic devices. In order to share the parameter, the electronic device 300 may transmit the above-described information for updating the parameter to the additional electronic devices.

Also, each additional electronic device may update another parameter for a different portion of the deep-learning model through training thereof and share the updated parameter with the electronic device 300. In order to share the parameter, the additional electronic device may transmit information for updating the corresponding parameter to the electronic device 300.

Accordingly, whenever training of the neural network is iterated, the parameters, which are generated by being distributed across multiple electronic devices and updated in the respective multiple electronic devices, may be shared among the multiple electronic devices.

In FIG. 11, three computation nodes (namely, three electronic devices) are illustrated as sharing training of the three layers of a deep-learning model. That is, computation node 1, computation node 2, and computation node 3 may serve to perform training of layer 1, training of layer 2, and training of layer 3, respectively, and update the parameters of the respective layers over time while training is being performed.

The processing unit 310 of the electronic device 300 may perform training of one of the multiple layers of a deep-learning model. The processing unit 310 may update the parameter for the corresponding layer. The processing unit 310 may generate information for updating the parameter of the layer based on the value of the parameter updated through training and the previous value of the parameter before training is performed. The information for updating the parameter of the layer may be transmitted to other electronic devices that perform training of the other layers.

The information for updating the parameter may be transmitted whenever training is iterated.

As described above, the information for updating the parameter may include the residual of the parameter, or may indicate the residual. The residual of the parameter may be the difference between the value of the parameter at the current iteration and the value of the parameter at the previous iteration. Alternatively, the information for updating the parameter may include the residuals of a kernel filter.

Figure 12:
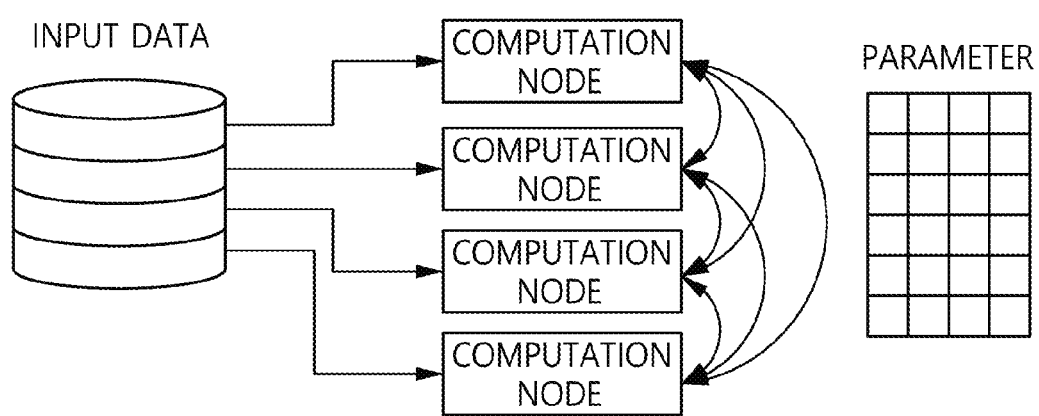
FIG. 12 shows sharing of a parameter in a data parallelism approach according to an example.

FIG. 12 shows sharing of parameters in a data parallelism approach according to an example.

In the data parallelism approach, input data used for training may be partitioned. Computation nodes may perform training of a deep-learning model using the partitioned input data.

That is, each of the multiple electronic devices 300 may perform training of the deep-learning model using the partitioned input data, which is generated by partitioning the input data.

When a sharing method based on star topology is used, the electronic device 300 may transmit information for updating a parameter to a parameter server. The parameter server stores the received information for updating the parameter therein, thereby recording the result of training performed by the electronic devices. The parameter server may transmit the received information for updating the parameter to other electronic devices. The other electronic devices may update the parameter using the received information for updating the parameter. Through such transmission and update, training may be continuously performed.

Alternatively, the electronic device 300 may transmit the updated parameter to a parameter-sharing server. The parameter-sharing server may transmit only the residual of the parameter, acquired using the updated parameter and the parameter stored therein, to other electronic devices. Here, the residual of the parameter may be the difference between the value of the parameter stored in the parameter-sharing server and the updated value of the parameter transmitted from the electronic device 300.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software.

A computer-readable storage medium may include information used in the embodiments of the present disclosure. For example, the computer-readable storage medium may include a bitstream, and the bitstream may contain the information described above in the embodiments of the present disclosure.

The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

The invention claimed is:

1. A method for updating a parameter, performed by an electronic device, comprising:
receiving information for updating a parameter; and
updating the parameter using the information for updating the parameter,
wherein:
the parameter comprises multiple parameters,
residuals of the multiple parameters are generated based on the information for updating the parameter,
the residuals of the multiple parameters are added to the multiple parameters, respectively,
the residuals of the multiple parameters are acquired by performing decoding on compressed information for the residuals of the multiple parameters included in the information for updating the parameter, and
the multiple parameters are updated using the residuals of the multiple parameters.

2. The method of claim 1, wherein the multiple parameters are deep-learning parameters that configure one layer of a deep-learning model.

3. The method of claim 1, wherein, when the decoding is performed, a method for decoding a block of an image is used, and
the parameter is used to determine a context of the block.

4. The method of claim 3, wherein each of the multiple parameters corresponds to the block.

5. The method of claim 3, wherein:
the block comprises multiple blocks,
the multiple blocks configure a target image, and
when the decoding is performed, a method for decoding the target image is used.

6. The method of claim 3, wherein, in order to perform the decoding, one or more of entropy decoding, scanning, dequantization, and inverse-transform of the block are used.

7. The method of claim 1, wherein:
based on the information for updating the parameter, scanned information is generated, and
the scanned information includes scanned quantized gradients.

8. The method of claim 7, wherein:
quantized gradients are generated by performing 1D-to-2D scanning for the scanned information,
reconstructed gradients are generated by performing dequantization for the quantized gradients, and
the reconstructed gradients are residuals of the multiple parameters.

9. The method of claim 7, wherein:
the scanned information includes a zero subblock, and
the zero subblock indicates a specified region in a block and indicates that values of all of quantized gradients in the specified region are 0.

10. The method of claim 7, wherein:
the scanned information includes a zero block, and the zero block indicates that values of all of quantized gradients in the block are 0.

11. The method of claim 7, wherein;
the scanned information includes a zero layer, and
the zero layer indicates that values of all of quantized gradients in all of blocks of the layer are 0.

12. An electronic device, comprising:
a communication unit for receiving information for updating a parameter; and
a processing unit for updating the parameter using the information for updating the parameter,
wherein the parameter comprises multiple parameters,
the processing unit generates residuals of the multiple parameters based on the information for updating the parameter,
the processing unit adds the residuals of the multiple parameters to the multiple parameters, respectively,
the processing unit acquires the residuals of the multiple parameters by performing decoding on compressed information for the residuals of the multiple parameters included in the information for updating the parameter, and
the processing unit updates the multiple parameters using the residuals of the multiple parameters.

13. The method of claim 1, wherein, when the decoding is performed, a method for decoding a block of an image is used, and
the parameter to is used to determine motion information of the block.

14. The method of claim 12, wherein, when the processing unit performs the decoding, the processing unit uses a method for decoding a block of an image, and
the processing unit uses the parameter to determine a context of the block.

15. The method of claim 12, wherein, when the decoding is performed, the processing unit uses a method for decoding a block of an image, and
the processing unit uses the parameter to determine motion information of the block.

* * * * *